US012568157B2

(12) United States Patent
Warren et al.

(10) Patent No.: US 12,568,157 B2
(45) Date of Patent: Mar. 3, 2026

(54) PACKET FORMAT ADJUSTMENT TECHNOLOGIES

(71) Applicant: Intel Corporation, Santa Clara, CA (US)

(72) Inventors: Bruce G. Warren, Poulsbo, WA (US); Robert Zak, Bolton, MA (US); Mark Debbage, Santa Clara, CA (US); Todd Rimmer, Exton, PA (US)

(73) Assignee: Intel Corporation, Santa Clara, CA (US)

( * ) Notice: Subject to any disclaimer, the term of this patent is extended or adjusted under 35 U.S.C. 154(b) by 755 days.

(21) Appl. No.: 17/560,110

(22) Filed: Dec. 22, 2021

(65) Prior Publication Data

US 2022/0116325 A1     Apr. 14, 2022

(51) Int. Cl.
| | |
|---|---|
| *H04L 69/22* | (2022.01) |
| *H04L 69/321* | (2022.01) |
| *H04L 69/324* | (2022.01) |
| *H04L 69/325* | (2022.01) |
| *H04L 1/00* | (2006.01) |
| *H04L 12/40* | (2006.01) |
| *H04L 67/02* | (2022.01) |

(52) U.S. Cl.
CPC ............ *H04L 69/22* (2013.01); *H04L 69/321* (2013.01); *H04L 69/324* (2013.01); *H04L 69/325* (2013.01); *H04L 1/0006* (2013.01); *H04L 12/40071* (2013.01); *H04L 67/02* (2013.01)

(58) Field of Classification Search
CPC ....... H04L 45/74; H04L 45/745; H04L 69/00; H04L 69/22; H04L 1/0006; H04L 1/0091; H04L 12/40071; H04L 51/066
See application file for complete search history.

(56) References Cited

U.S. PATENT DOCUMENTS

| | | | |
|---|---|---|---|
| 2005/0169311 A1 | 8/2005 | Millet et al. | |
| 2007/0115939 A1* | 5/2007 | Lee ......................... | H04L 45/06 |
| | | | 370/352 |

(Continued)

FOREIGN PATENT DOCUMENTS

| | | |
|---|---|---|
| WO | 2007074423 A2 | 7/2007 |
| WO | 2018178906 A1 | 10/2018 |

OTHER PUBLICATIONS

Birrittella, Mark S. et al., "Intel® Omni-Path Architecture Enabling Scalable, High Performance Fabrics", 2015 IEEE 23rd Annual Symposium on High-Performance Interconnects, 9 pages.

(Continued)

*Primary Examiner* — Warner Wong
(74) *Attorney, Agent, or Firm* — Compass IP Law PC

(57) ABSTRACT

Examples described herein relate to a network interface device that includes circuitry to decide packet format of a packet including data to be transmitted based on network utilized to transmit the packet and circuitry to form the packet based on the decided packet format. In some examples, the network utilized to transmit the packet is based on an egress port of the packet. In some examples, the network utilized to transmit the packet comprises one or more of: direct interconnect, small scale-up network, or large scale-out network. In some examples, to decide packet format, the circuitry is to form the packet byte by byte to reduce overhead caused by preamble and number of header fields.

20 Claims, 9 Drawing Sheets

| SoF | MAC Dest (6B) | MAC SRC (6B) | 802.1Q tag (4B) | Ethertype (2B) | IPv4 Header (20B) | UDP Header (8B) | Reliable Transport (4B) | Header + Data (12B + 64B) | FCS (4B) | EoF |
|---|---|---|---|---|---|---|---|---|---|---|

| SoF | MAC Dest (6B) | MAC SRC (6B) | 802.1Q tag (4B) | Ethertype (2B) | Reliable Transport (4B) | Header + Data (12B + 64B) | FCS (4B) | EoF |
|---|---|---|---|---|---|---|---|---|

| SoF | MAC Dest (2B) | Masked (2B) | MAC Dest (2B) | Switch Checks Masked (6B) | 802.1Q tag (4B) | Ethertype (2B) | Reliable Transport (4B) | Header + Data (12B + 64B) | FCS (4B) | EoF |
|---|---|---|---|---|---|---|---|---|---|---|

| SoF | MAC Dest (2B) | MAC SRC (2B) | MAC Dest (2B) | Reliable Transport (4B) | 802.1Q tag (4B) | Ethertype (2B) | Header + Data (12B + 64B) | FCS (4B) | EoF |
|---|---|---|---|---|---|---|---|---|---|

| SoF | Type | PCP | MAC SRC (2B) | MAC Dest (2B) | Reliable Transport (4B) | Header + Data (12B + 64B) | FCS (4B) | EoF |
|---|---|---|---|---|---|---|---|---|

(56) References Cited

U.S. PATENT DOCUMENTS

| | | | | |
|---|---|---|---|---|
| 2012/0289170 | A1* | 11/2012 | Li | H04W 72/542 |
| | | | | 455/73 |
| 2015/0103822 | A1* | 4/2015 | Gianchandani | H04L 69/08 |
| | | | | 370/389 |
| 2015/0373155 | A1* | 12/2015 | Singh | H04L 69/22 |
| | | | | 370/467 |
| 2016/0197832 | A1 | 7/2016 | Barry et al. | |
| 2019/0052582 | A1* | 2/2019 | Gaal | H04L 1/1887 |
| 2019/0075006 | A1* | 3/2019 | Yi | H04L 27/26025 |
| 2019/0098626 | A1* | 3/2019 | Yi | H04W 72/12 |
| 2019/0206023 | A1* | 7/2019 | Dimitrov | G06T 15/005 |
| 2020/0068050 | A1* | 2/2020 | Foo | G06F 9/30098 |
| 2020/0089613 | A1* | 3/2020 | Li | G06T 1/20 |
| 2020/0125368 | A1* | 4/2020 | Kaldewey | G06F 16/24569 |
| 2020/0244780 | A1* | 7/2020 | Peled | H04L 69/12 |
| 2020/0314009 | A1* | 10/2020 | Goswami | H04L 49/3009 |
| 2021/0234778 | A1* | 7/2021 | Bendigeri | H04L 69/14 |
| 2021/0243121 | A1* | 8/2021 | Urman | H04L 45/745 |
| 2021/0243647 | A1 | 8/2021 | Tang | |
| 2022/0149979 | A1* | 5/2022 | Yu | H04L 47/24 |
| 2022/0197664 | A1* | 6/2022 | Patterson | G06N 3/08 |

OTHER PUBLICATIONS

Schor, David, "A look at Nvidia's NVLink interconnect and the NVSwitch", https://fuse.wikichip.org/news/1224/a-look-at-nvidias-nvlink-interconnect-and-the-nvswitch/, May 6, 2018, 9 pages.
Sensi, Daniele De et al., "An In-Depth Analysis of the Slingshot Interconnect", Aug. 20, 2020, 13 pages.
International Search Report and Written Opinion for PCT Patent Application No. PCT/US22/49613, Mailed Mar. 20, 2023, 11 pages.

* cited by examiner

FIG. 2

Figure 4:
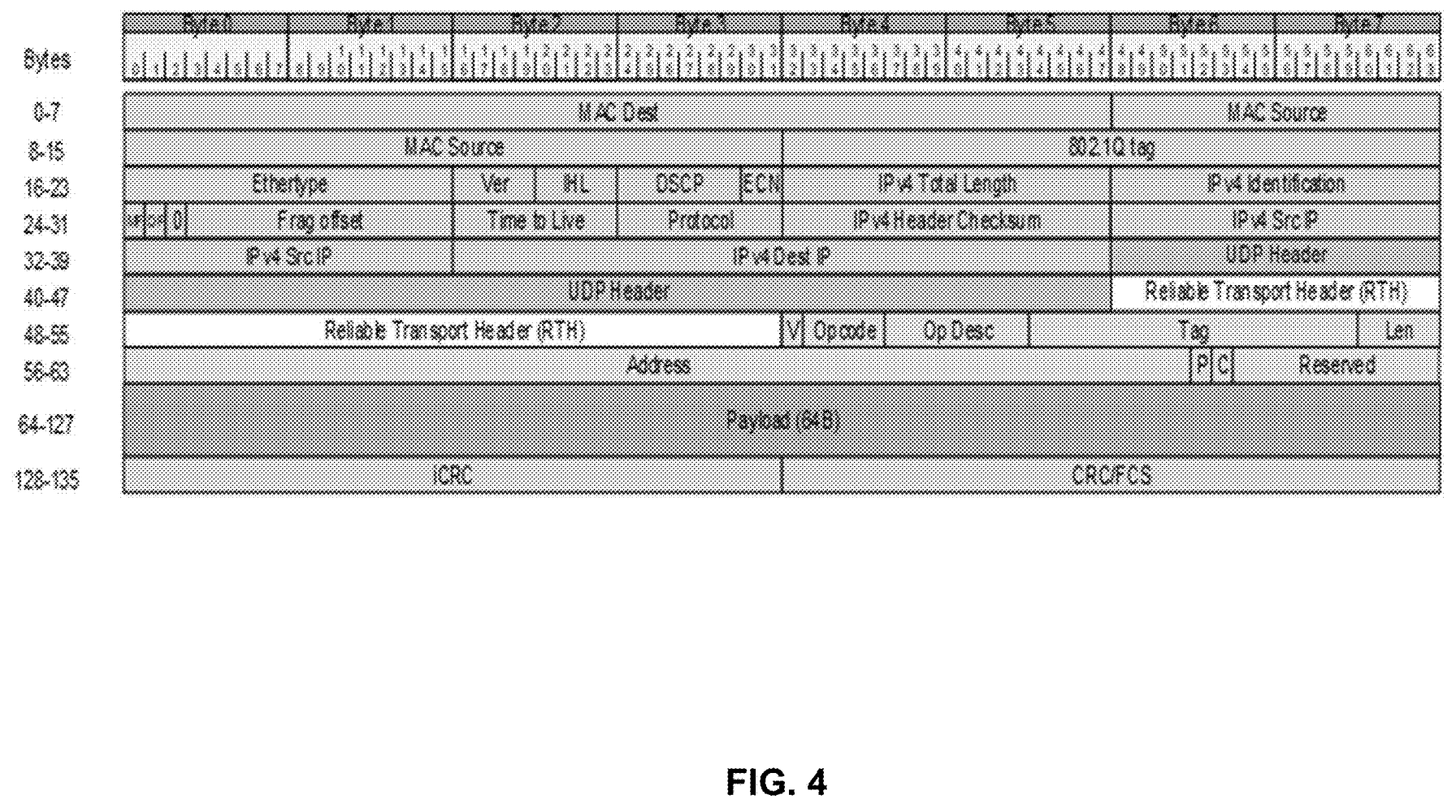

Bytes
0-7
8-15
16-23
24-31
32-39
40-47
48-55
56-63
64-127
128-135

| | | | | |
|---|---|---|---|---|
| MAC Source | MAC Source | MAC Source | MAC Dest | MAC Dest |
| | | 802.1Q tag | | |
| Ethertype | Ver | IHL | DSCP | ECN | IPv4 Total Length |
| IPv4 Identification | Frag offset | Time to Live | Protocol | IPv4 Header Checksum |
| IPv4 Src IP | IPv4 Src IP | IPv4 Dest IP |
| UDP Header | UDP Header |
| Reliable Transport Header (RTH) | Reliable Transport Header (RTH) |
| Len | Tag | V | Opcode | Op Desc |
| Reserved | P/C | Address |
| Payload (64B) |
| CRC/FCS | CRC |

DETERMINE NETWORK TO USE TO SEND DATA TO ANOTHER PROCESSOR
702

FORM PACKET BASED ON DETERMINED NETWORK
704

TRANSMIT PACKET TO DESTINATION PROCESSOR
706

PACKET FORMAT ADJUSTMENT TECHNOLOGIES

Cloud computing provides a client device with access to computing and storage resources of remote computers in data centers. The client can make use of a remote computer or cluster of computers to perform a variety of processing or computing operations as well as remote data processing and data storage or retrieval. For example, a client can be a smart phone, Internet-of-Things (IoT) compatible device such as a smart home, building appliance (e.g., refrigerator, light, camera, or lock), wearable device (e.g., health monitor, smart watch, smart glasses), connected vehicle (e.g., self-driving car), and smart city (e.g., traffic sensor, parking sensor, energy use sensor). Remote computers or clusters of computers can include a data center that is connected to the client using a high-speed networking connection. Large amounts of packet traffic can be present within a data center.

BRIEF DESCRIPTION OF THE DRAWINGS

FIG. 2 depicts an example packet format.
FIG. 4 depicts an example packet format.
FIG. 5 depicts an example packet format.

DETAILED DESCRIPTION

Computing systems can utilize buses, interconnects, and network interface devices to communicate with other computing systems. Some computing systems are utilized in connection with High Performance Compute (HPC) and Artificial Intelligence systems (AI) environments. In some examples, HPC and AI systems can include scale-up interconnected cluster of graphics processing units (GPUs) that are connected together with an internal bus or with a switch that connects a small number of GPUs (e.g., 4 to 8 GPUs). A cluster of GPUs can be connected to other clusters of GPUs using a scale-out system using data center class switches in fat-tree, dragonfly, or other fabric topologies. For example, scale-out systems can include thousands of GPUs. With increasing amounts of packets transmitted in the scale-up and scale-out systems, reduction of even a small amount of packet overhead size can improve the goodput of the network.

Figure 1:
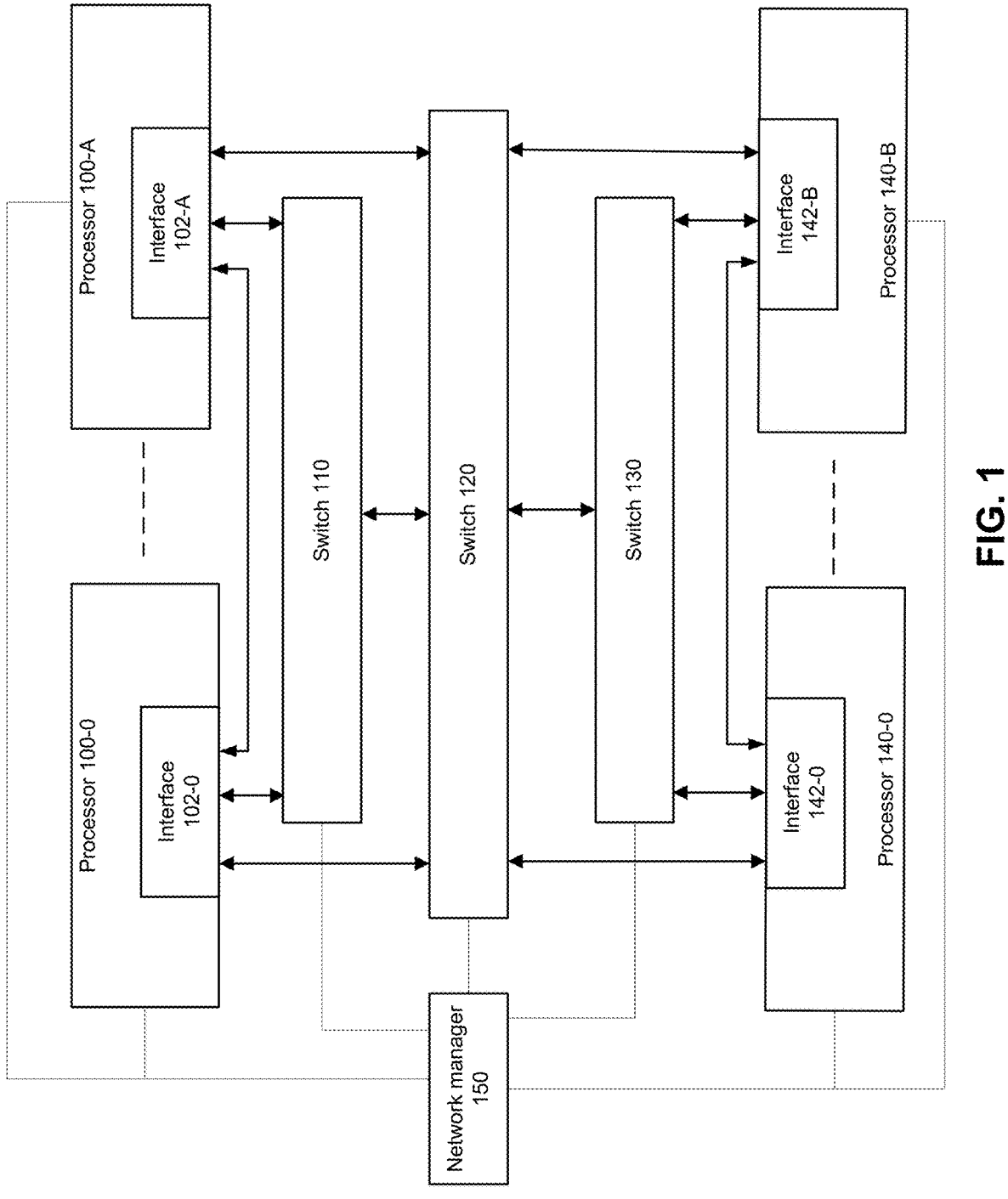
FIG. 1 depicts an example system.

FIG. 1 depicts an example system. Processors 100-0 to 100-A (A≥1) and processors 140-0 to 140-B (B≥1) can include one or more of: a graphics processing unit (GPU), central processing unit (CPU), accelerator, infrastructure processing unit (IPU), data processing unit (DPU), application specific integrated circuit (ASIC), and so forth. One of processors 100-0 to 100-A can be coupled to another of processors 100-0 to 100-A using an interface via a direct connection (e.g., proprietary format or a standard interconnect (e.g., Ethernet or InfiniBand)). One of processors 100-0 to 100-A can be coupled to another of processors 100-0 to 100-A using an interface via switch 110 as part of a small scale-up network or private network. One of processors 100-0 to 100-A can be coupled to one or more of processors 140-0 to 140-B using an interface and via switch 120 as part of a scale out network, for example in a data center or a large scale-out network.

One or more of interfaces 102-0 to 102-A and 142-0 to 142-B can be configured with one or more connection options to another processor. Connection options can include: direct interconnect, private network with switch 110 or switch 130 (e.g., Open Compute Project (OCP) platform with 6-8 processors), or data center network via switch 120 (e.g., connection through larger fabric (Ethernet)). In some examples, interface 102-0 can be integrated into a same system on chip (SoC) or integrated circuit with processor 100-0. Similarly, interfaces 102-1 to 102-A can be integrated into a same system on chip or integrated circuit with respective processor 100-1 to 100-A.

Some examples adjust a frame format depending on a network utilized to transmit a packet. In some examples, the packet can include data, which can vary in size from sub-cache line, cache line size, and larger. Interface can select a packet format, including data to be transmitted, preamble, header, and end. For scale-up links, less frame overhead is used as the number of potential destinations is relatively small as is the possibility of data corruption. Scale-out links can utilize more routing information which may vary on a per-connection basis depending on whether the connection is contained within a single rack or traverses multiple tiers of a large-scale data network. Accordingly, per-connection goodput efficiency can be tuned. In some examples, packet of multiple different formats can be transmitted or received by interfaces 102-0 to 102-A and 142-0 to 142-B simultaneously.

In some examples, an egress port from an interface can be related to network used (e.g., direct interconnect, private network with a single switch, or data center network). Selection of packet format can be based on egress port of the data. However, multiple independent frame formats may be supported for any port. For example, Port 0 can be used for direct connect, Port 1 can be used for small switch, and Port 2 can be used for larger switch.

Formation of header of the packet can be performed byte-by-byte to reduce a size of header. A packet can be formed to not carry information in header that is also in payload or vice versa. For example, a payload might indicate a target or source entity (e.g., device identifier or process identifier). Some examples, remove redundant information and indicate the information in one data structure. Determination of bytes to include in header can be based on network used. A header for a direct connect can be based on a context-indexed table. A header to be transmitted in a private network can use source address (SA), destination address (DA), and context-indexed table. A header to be transmitted in a data center network can use SA, DA, and context-indexed table.

Some examples provide interoperability with various switch vendors' products by supporting custom frames when possible or standard frames to provide compatibility with switches and network interface devices. Switches 110, 120, and 130 can be configured to interpret header locations and header values of standard frame formats or a set of custom formats.

Packet format can be identified in bytes near and/or at start of frame (SoF) delimiter byte, header, preamble, or packet payload. For example, one or more bits in an Ethernet preamble can indicate a particular packet format is used. To differentiate the frame types, the SoF and preamble could be encoded as in Table 1.

TABLE 1

| Byte | Bit | | Example Description |
|------|-----|---|---------------------|
| (SoF-3) | 7:0 | xx | Preamble bytes indicating frame type. |
| (SoF-2) | | yy | 0x00_11 Frame type 0 |
| | | | 0x11_22 Frame type 1 |
| | | | 0xaa_aa Frame type 2 |
| (SoF-1) | 7:0 | zz | Check byte +2 |
| | | | 0x44 Data frame (2 bits set + 2 = 0x4) |
| | | | 0x66 Frame type 1 (4 bits set + 2 = 0x6) |
| | | | 0xaa Frame type 2 (8 bits set + 2 = 0xa) |
| SoF | 7:0 | /S/ | IEEE 802.3 SoF delimiter |

Given the preamble is only corrected by forward error correction (FEC) and not covered by the frame check sequence (FCS), the first two preamble bytes used to differentiate between default codes were chosen so multiple bits would have silently flip to incorrectly decode the frame type. The third preamble byte can be used as a check byte and for this example include a modulo count of the number bits set in the preceding two bytes plus 2 in a nibble. This encoding allows for a frame type 2 to be the standard Ethernet preamble. Preamble bytes as well as frame type accepted could be configurable via a register on a per port basis. Additionally, a Cyclic Redundancy Check (CRC) or other technology could be used to validate the preamble fields. A pre-defined set of bits in the frame header could also be used to differentiate frame format types.

Network manager 150 can determines connection paths (e.g., networks) between processors and configure interfaces with such paths. Paths can be changed based on congestion (e.g., incast, failure, etc.).

Note that a receiver interface can receive packets and interpret packets based on format indication in packet header and/or preamble. A receiver interface can send an acknowledgement of receipt (ACK) to a sender interface. The receiver can also validate a preamble using a CRC value or other checksum.

Figure 2:
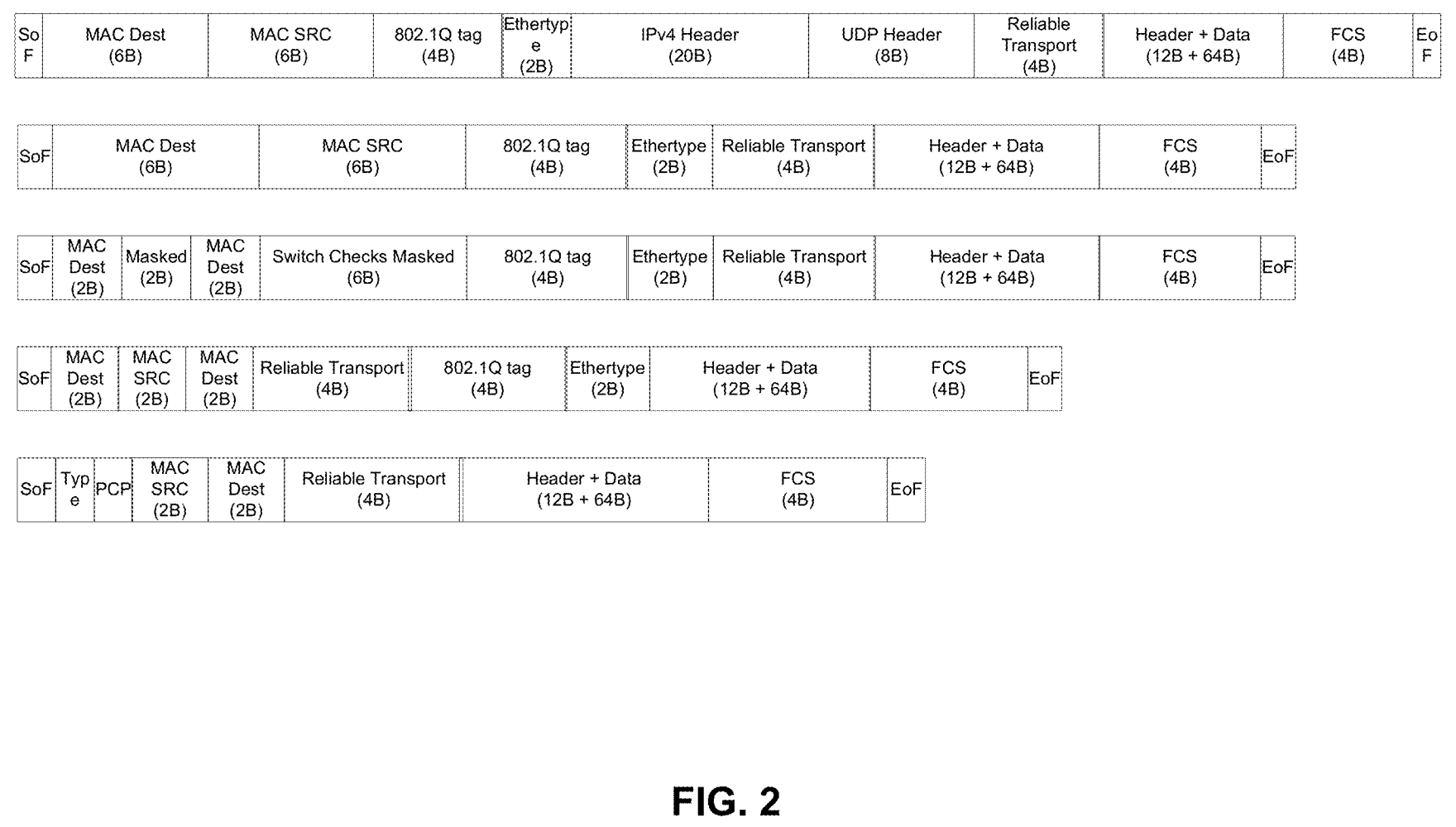

FIG. 2 depicts an example of a variety of frame formats that can be constructed. For a direct connection network, a custom header can be OB or more bytes. For a small switch (private) network, headers can be included such as L2 header fields (e.g., MAC, Ethertype). For a datacenter network, L3 headers can be used (e.g., IPv4 or IPv6 headers). For example, a first frame format can be a IPv4 frame for scale-out. The first frame format has a link efficiency of ~50% (64B data/130B total) for a small payload while the bottom frame format has a link efficiency of ~70%. The other frame formats are non-exhaustive examples of other formats that could be created. Reliable transport headers can include packet sequence number and transaction identifier and be used for confirmation of packet receipt. A receiver can support go back N and selective ACKs for unreceived packets.

Figure 3:
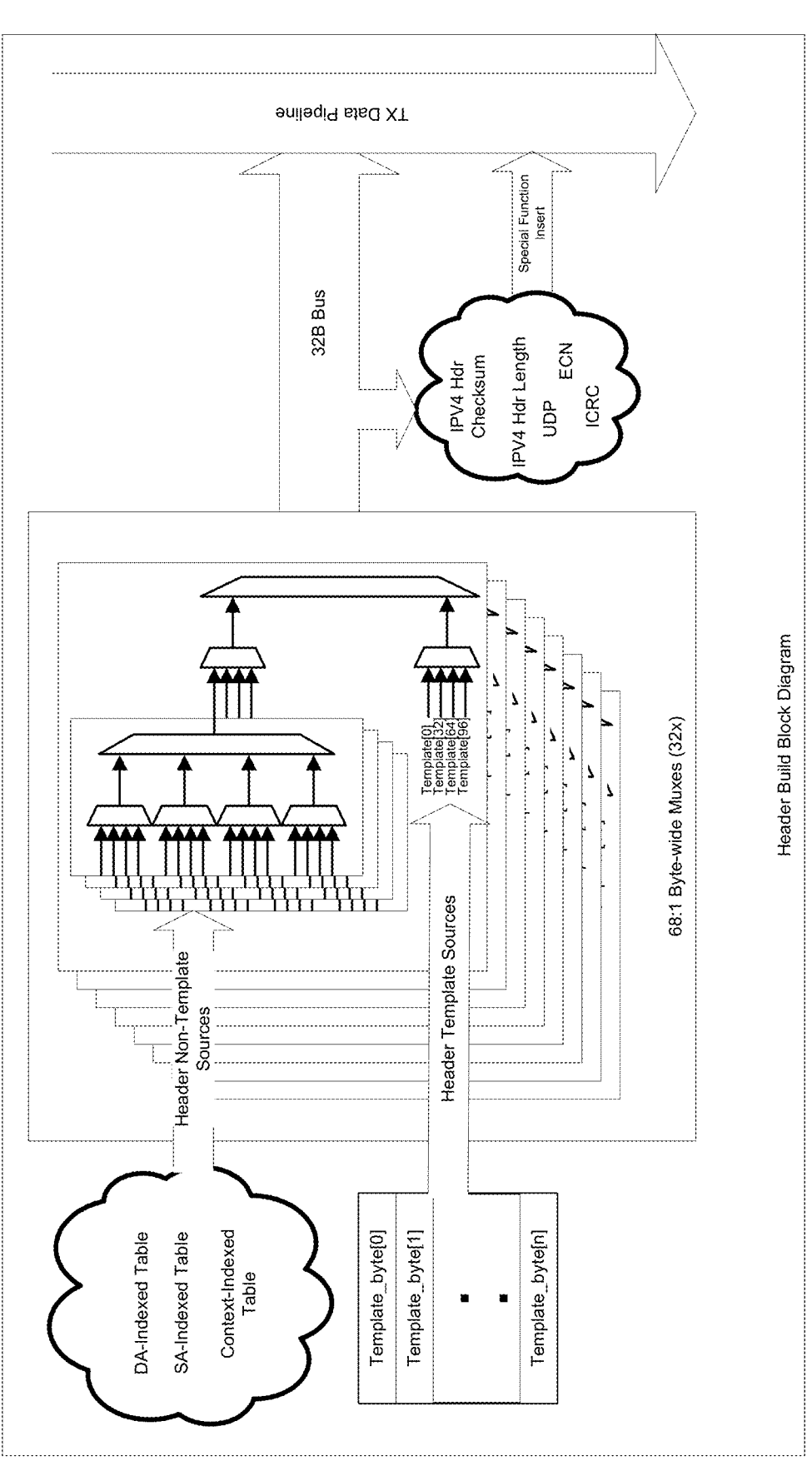
FIG. 3 depicts an example system.

FIG. 3 depicts an example manner of forming a packet. A header can be created from content from a group of registers with multiple connection context-indexed tables. Some fields, such as CRC and length, can be calculated. On a receive, the reverse operation could be performed, extracting the connection context information for the frame to further reduce frame overhead rather than having additional bytes of overhead in the frame to explicitly contain the context reference.

For example, a header can be built by selecting the source of each byte of data within the header. Sources of content of a frame can include: static "template" registers, destination address (DA)-indexed table, source address (SA)-indexed table, context-indexed table, and/or dedicated functions (CRC, length, etc.)

An example of a destination address (DA)-indexed table is 24B/entry and requires an entry for each supported Destination Address. For a 16K entry table, the memory used would be approximately ~400 kB. For many frame formats, 12B/entry is sufficient so the table requirements could be halved to ~200 kB by supporting only 8K entries for header formats requiring more than 12B/entry. Indexing into this table could be either a hashed or direct lookup depending on DA assignment choice.

A source address (SA)-indexed table is be provided to support one or more Source Addresses (SA) for a given endpoint. The SA-indexed table can include 24B/entry to be symmetrical with the DLID table but only has small number of entries.

Table 2 provides a high-level view of how to specify an Ethernet header, whether standard or customized. Examples of building an IPv4, IPv6 and custom frames follow.

TABLE 2

| Protocol | Field Name | Source |
|----------|-----------|--------|
| Preamble (Inserted by MAC) | IPG | Any minimum number of octets from 12 to 3 is supported. Note: Some Idle insertion will occur as required to pad out packets to multiples of 8 octets or as otherwise required to support Ethernet standard behavior. |
| | Preamble SoF | Any minimum number of octets from 7 to 3 is supported. Start of frame delimiter |
| Header Build-up | Header Template_reg [127:0][7:0] | Template for encapsulation header. Source selection registers determine if encap header or alternate data is used on a byte resolution. |
| | Header Source selection [127:0][7:0] | Selects source of header with a byte resolution. Source: |
| | | 0x00-DA indexed table Bytes [0]    0x20-SA indexed table Bytes [0] |
| | | 0x01-DA indexed table Bytes [1]    0x21-SA indexed table Bytes [1] |
| | | 0x02-DA indexed table Bytes [2]    0x22-SA indexed table Bytes [2] |
| | | 0x03-DA indexed table Bytes [3]    0x23-SA indexed table Bytes [3] |
| | | 0x04-DA indexed table Bytes [4]    0x24-SA indexed table Bytes [4] |
| | | 0x05-DA indexed table Bytes [5]    0x25-SA indexed table Bytes [5] |

TABLE 2-continued

| Protocol | Field Name | Source | |
|---|---|---|---|
| | | 0x06-DA indexed table Bytes [6] | 0x26-SA indexed table Bytes [6] |
| | | 0x07-DA indexed table Bytes [7] | 0x27-SA indexed table Bytes [7] |
| | | 0x08-DA indexed table Bytes [8] | 0x28-SA indexed table Bytes [8] |
| | | 0x09-DA indexed table Bytes [9] | 0x29-SA indexed table Bytes [9] |
| | | 0x0a-DA indexed table Bytes [10] | 0x2a-SA indexed table Bytes [10] |
| | | 0x0b-DA indexed table Bytes [11] | 0x2b-SA indexed table Bytes [11] |
| | | 0x0c-DA indexed table Bytes [12] | 0x2c-SA indexed table Bytes [12] |
| | | 0x0d-DA indexed table Bytes [13] | 0x2d-SA indexed table Bytes [13] |
| | | 0x0e-DA indexed table Bytes [14] | 0x2e-SA indexed table Bytes [14] |
| | | 0x0f-DA indexed table Bytes [15] | 0x2f-SA indexed table Bytes [15] |
| | | 0x10-DA indexed table Bytes [16] | 0x30-SA indexed table Bytes [16] |
| | | 0x11-DA indexed table Bytes [17] | 0x31-SA indexed table Bytes [17] |
| | | 0x12-DA indexed table Bytes [18] | 0x32-SA indexed table Bytes [18] |
| | | 0x13-DA indexed table Bytes [19] | 0x33-SA indexed table Bytes [19] |
| | | 0x14-DA indexed table Bytes [20] | 0x34-SA indexed table Bytes [20] |
| | | 0x15-DA indexed table Bytes [21] | 0x35-SA indexed table Bytes [21] |
| | | 0x16-DA indexed table Bytes [22] | 0x36-SA indexed table Bytes [22] |
| | | 0x17-DA indexed table Bytes [23] | 0x37-SA indexed table Bytes [23] |
| | | 0x18-0x1f unused | 0x38-0x3f unused |
| | | 0x40-0x5f unused | |
| | | 0x60-CONTEXT-indexed table byte [0] | |
| | | 0x61-CONTEXT-indexed table byte [1] | |
| | | 0x62-CONTEXT-indexed table byte [2] | |
| | | 0x63-CONTEXT-indexed table byte [3 | |
| | | 0x64-0x7f unused | |
| | | 0x80-template register | |
| | Header Len | Length of header being built from template | |
| | Minimum Frame Size | Minimum length of a valid Ethernet frame, smaller frames shall be padded with 0x00 to meet this length | |
| | ECN_locate | Enables insertion of ECN as well as specifies byte/bit offset. Control fields included: Location for result to be placed (byte # and lsb) Enable | |
| | UDP_locate | Enables insertion of UDP length field as well as specifies byte/bit offset. Control fields included: Start byte for length calculation Enable CRC enable | |
| | IPv4 Header Checksum locate | Enables insertion of IPv4 Header Checksum field as well as specifies byte offset. Control fields included: Start byte for checksum calculation Length Enable | |
| | IPv4 Header length locate | Enables insertion of IPv4 Header Length field as well as specifies byte offset. Control fields included: Start byte for length calculation End byte for length calculation Location for result to be placed (lowest byte #) Enable | |
| Payload | Payload locate | Start location for payload. RTH can be a start of the payload. Control fields included: Start byte for payload insertion | |

TABLE 2-continued

| Protocol | Field Name | Source |
|---|---|---|
| ICRC | ICRC locate | Invariant CRC algorithmically calculated as fame is built. Control fields included: Start byte for ICRC calculation (given by above entry) Enable |
| FCS | FCS | Can be calculated per IEEE 802.3, clause 3.2.9 Can be inserted by media access control (MAC) circuitry |

FIG. 4 depicts an example packet format for a large network connection. The packet can be formed byte-by-byte, in parallel, as described herein. Table 3 provides an example of bytes in the packet of FIG. 4.

TABLE 3

Ethernet Header {L2 w/802. 1q, IPv4, UDP, RTH} Build-up

| Field Byte # | Source Choice | Template value | Field Description |
|---|---|---|---|
| 0 | 0x00 | n/a | L2 Dest address [0] from destination local ID (DLID) indexed table [0] |
| 1 | 0x01 | n/a | L2 Dest address [1] from DLID indexed table [1] |
| 2 | 0x02 | n/a | L2 Dest address [2] from DLID indexed table [2] |
| 3 | 0x03 | n/a | L2 Dest address [3] from DLID indexed table [3] |
| 4 | 0x04 | n/a | L2 Dest address [4] from DLID indexed table [4] |
| 5 | 0x05 | n/a | L2 Dest address [5] from DLID indexed table [5] |
| 6 | 0x20 | n/a | L2 Source address [0] from SLID' indexed table [0] |
| 7 | 0x21 | n/a | L2 Source address [1] from SLID' indexed table [1] |
| 8 | 0x22 | n/a | L2 Source address [2] from SLID' indexed table [2] |
| 9 | 0x23 | n/a | L2 Source address [3] from SLID' indexed table [3] |
| 10 | 0x24 | n/a | L2 Source address [4] from SLID' indexed table [4] |
| 11 | 0x25 | n/a | L2 Source address [5] from SLID' indexed table [5] |
| 12 | 0x80 | 0x81 | L2 802.1q tag byte [0] |
| 13 | 0x80 | 0x80 | L2 802.1q tag byte [1] |
| 14 | 0x60 | n/a | L2 802.1q tag byte [2]-PCP, DEI and VLAN Id [11:8] from EECN indexed table [0] |
| 15 | 0x61 | n/a | L2 802.1q tag byte [3]-VLAN ID from EECN indexed table [1] |
| 16 | 0x80 | 0x00 | IPv4 EtherType byte [0] (IPv4) |
| 17 | 0x80 | 0x08 | IPv4 EtherType byte [1] (IPv4) |
| 18 | 0x80 | 0x45 | IPv4 Version & IHL |
| 19 | 0x80 | 0x00 | IPv4 DSCL, ECN placeholder (values added later in pipeline) |
| 20 | 0x80 | 0x00 | IPv4 Total Length placeholder (values added later in pipeline) |
| 21 | 0x80 | 0x00 | IPv4 Total Length placeholder (values added later in pipeline) |
| 22 | 0x62 | n/a | IPv4 Identification [0]- from EECN indexed table [2] |
| 23 | 0x63 | n/a | IPv4 Identification [1]- from EECN indexed table [3] |
| 24 | 0x80 | 0x02 | IPv4 Flags, Fragment Offset [0] (don't fragment) |
| 25 | 0x80 | 0x00 | IPv4 Fragment Offset [1] |
| 26 | 0x80 | 0x20 | IPv4 Time to Live (hop limit) |
| 27 | 0x80 | 0x11 | IPv4 Protocol (UDP) |
| 28 | 0x41 | n/a | IPv4 Header Checksum [0] |
| 29 | 0x42 | n/a | IPv4 Header Checksum [1] |
| 30 | 0x26 | n/a | IPv4 Source address [0] from source local ID (SLID') indexed table [6] |
| 31 | 0x27 | n/a | IPv4 Source address [1] from SLID' indexed table [7] |
| 32 | 0x28 | n/a | IPv4 Source address [2] from SLID' indexed table [8] |
| 33 | 0x29 | n/a | IPv4 Source address [3] from SLID' indexed table [9] |
| 34 | 0x06 | n/a | IPv4 Dest address [0] from DLID indexed table [6] |
| 35 | 0x07 | n/a | IPv4 Dest address [1] from DLID indexed table [7] |
| 36 | 0x08 | n/a | IPv4 Dest address [2] from DLID indexed table [8] |
| 37 | 0x09 | n/a | IPv4 Dest address [3] from DLID indexed table [9] |
| 38 | 0x80 | TBD | UDP Source port [0] |
| 39 | 0x80 | TBD | UDP Source port [1] |
| 40 | 0x80 | TBD | UDP Dest port [0] |
| 41 | 0x80 | TBD | UDP Dest port [1] |
| 42 | 0x80 | 0x00 | UDP Length [0] placeholder (values added later in pipeline) |
| 43 | 0x80 | 0x00 | UDP Length [1] placeholde (values added later in pipeline) |
| 44 | 0x80 | 0x00 | UDP Checksum [0] (optional w/IPv4 or added later in pipeline) |

TABLE 3-continued

Ethernet Header {L2 w/802. 1q, IPv4, UDP, RTH} Build-up

| Field Byte # | Source Choice | Template value | Field Description |
|---|---|---|---|
| 45 | 0x80 | 0x00 | UDP Checksum [1] (optional w/IPv4 or added later in pipeline) |

Figure 5:
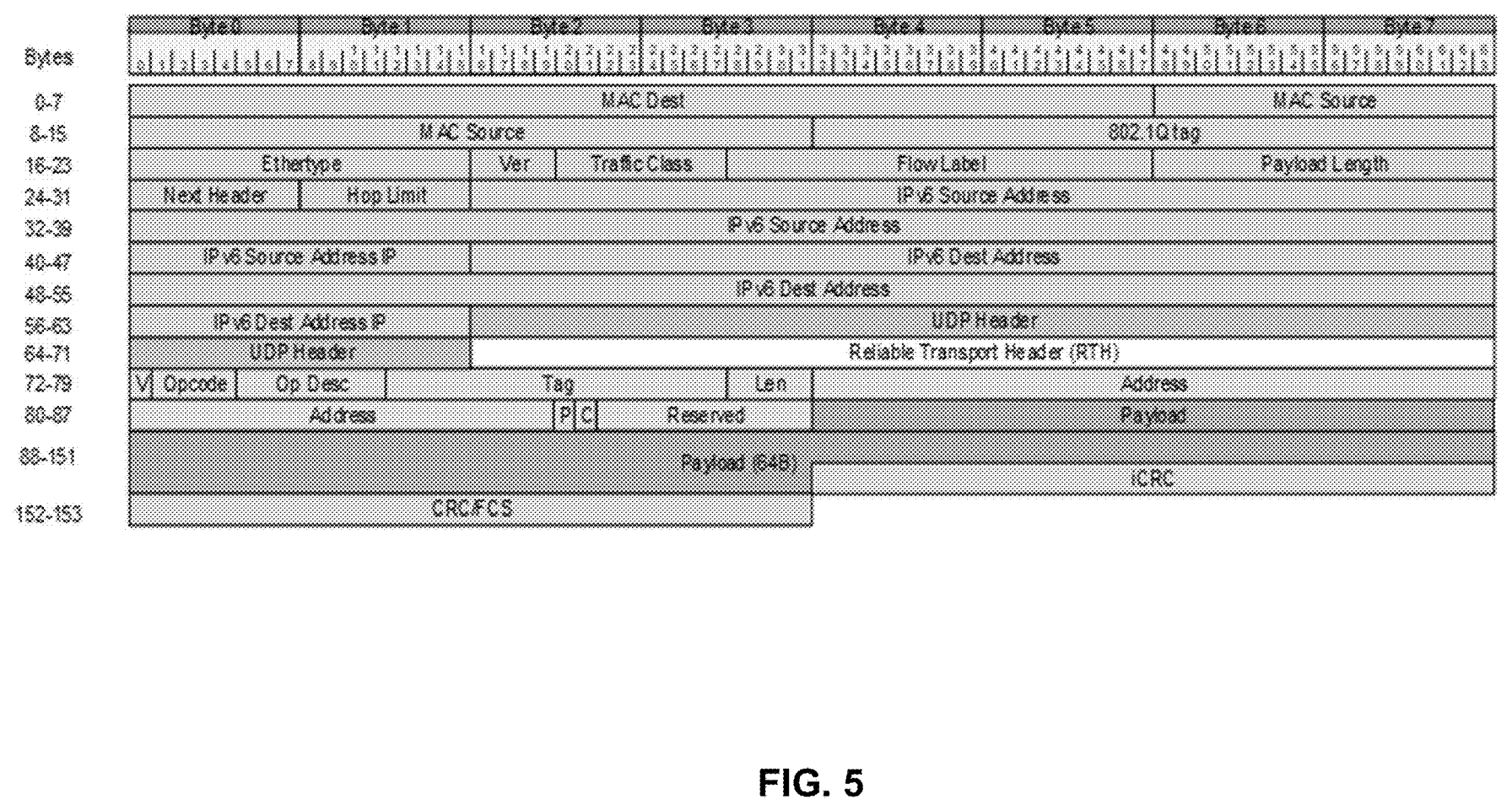

FIG. 5 depicts an example packet format for a data center network connection. Table 4 provides an example of bytes in the packet of FIG. 5.

TABLE 4

| Field Byte # | Source Choice | Template value | Field Description |
|---|---|---|---|
| 0 | 0x00 | n/a | L2 Dest address [0] from DLID indexed table [0] |
| 1 | 0x01 | n/a | L2 Dest address [1] from DLID indexed table [1] |
| 2 | 0x02 | n/a | L2 Dest address [2] from DLID indexed table [2] |
| 3 | 0x03 | n/a | L2 Dest address [3] from DLID indexed table [3] |
| 4 | 0x04 | n/a | L2 Dest address [4] from DLID indexed table [4] |
| 5 | 0x05 | n/a | L2 Dest address [5] from DLID indexed table [5] |
| 6 | 0x20 | n/a | L2 Source address [0] from SLID' indexed table [0] |
| 7 | 0x21 | n/a | L2 Source address [1] from SLID' indexed table [1] |
| 8 | 0x22 | n/a | L2 Source address [2] from SLID' indexed table [2] |
| 9 | 0x23 | n/a | L2 Source address [3] from SLID' indexed table [3] |
| 10 | 0x24 | n/a | L2 Source address [4] from SLID' indexed table [4] |
| 11 | 0x25 | n/a | L2 Source address [5] from SLID' indexed table [5] |
| 12 | 0x80 | 0x81 | L2 802.1q tag byte [0] |
| 13 | 0x80 | 0x80 | L2 802.1q tag byte [1] |
| 14 | 0x06 | n/a | L2 802.1q tag byte [2]-PCP, DEI and VLAN Id [11:8] from EECN indexed table [0] |
| 15 | 0x60 | n/a | L2 802.1q tag byte [3]-VLAN ID from EECN indexed table [1] |
| 16 | 0x80 | 0xdd | L2 EtherType byte [0] (IPv6) |
| 17 | 0x80 | 0xdd | L2 EtherType byte [1] (IPv6) |
| 18 | 0x80 | 0x06 | IPv6 Version, 4b of Traffic Class |
| 19 | 0x17 | n/a | IPv6 4b of Traffic Class, Flow Label bottom 4b from DLID indexed table [6] |
| 20 | 0x18 | n/a | IPv6 Flow Label [1] from DLID indexed table [6] (could use EECN indexed table [2]) |
| 21 | 0x19 | n/a | IPv6 Flow Label [2] from DLID indexed table [7] (could use EECN indexed table [3]) |
| 22 | 0x80 | 0x00 | IPv6 Payload Length [0] |
| 23 | 0x80 | 0x00 | IPv6 Payload Length [1] |
| 24 | 0x80 | 0x11 | IPv6 Next Header (UDP) |
| 25 | 0x80 | 0x20 | IPv6 Hop Limit |
| 26 | 0x28 | n/a | IPv6 Source address [0] from SLID' indexed table [8] |
| 27 | 0x29 | n/a | IPv6 Source address [1] from SLID' indexed table [9] |
| 28 | 0x2a | n/a | IPv6 Source address [2] from SLID' indexed table [10] |
| 29 | 0x2b | n/a | IPv6 Source address [3] from SLID' indexed table [11] |
| 30 | 0x2c | n/a | IPv6 Source address [4] from SLID' indexed table [12] |
| 31 | 0x2d | n/a | IPv6 Source address [5] from SLID' indexed table [13] |
| 32 | 0x2e | n/a | IPv6 Source address [6] from SLID' indexed table [14] |
| 33 | 0x2f | n/a | IPv6 Source address [7] from SLID' indexed table [15] |
| 34 | 0x30 | n/a | IPv6 Source address [8] from SLID' indexed table [16] |
| 35 | 0x31 | n/a | IPv6 Source address [9] from SLID' indexed table [17] |
| 36 | 0x32 | n/a | IPv6 Source address [10] from SLID' indexed table [18] |
| 37 | 0x33 | n/a | IPv6 Source address [11] from SLID' indexed table [19] |
| 38 | 0x34 | n/a | IPv6 Source address [12] from SLID' indexed table [20] |
| 39 | 0x35 | n/a | IPv6 Source address [13] from SLID' indexed table [21] |
| 40 | 0x36 | n/a | IPv6 Source address [14] from SLID' indexed table [22] |
| 41 | 0x37 | n/a | IPv6 Source address [15] from SLID' indexed table [23] |
| 42 | 0x08 | n/a | IPv6 Dest address [0] from DLID indexed table [8] |
| 43 | 0x09 | n/a | IPv6 Dest address [1] from DLID indexed table [9] |
| 44 | 0x0a | n/a | IPv6 Dest address [2] from DLID indexed table [10] |
| 45 | 0x0b | n/a | IPv6 Dest address [3] from DLID indexed table [11] |
| 46 | 0x0c | n/a | IPv6 Dest address [4] from DLID indexed table [12] |
| 47 | 0x0d | n/a | IPv6 Dest address [5] from DLID indexed table [13] |
| 48 | 0x0e | n/a | IPv6 Dest address [6] from DLID indexed table [14] |
| 49 | 0x0f | n/a | IPv6 Dest address [7] from DLID indexed table [15] |
| 50 | 0x10 | n/a | IPv6 Dest address [8] from DLID indexed table [16] |
| 51 | 0x11 | n/a | IPv6 Dest address [9] from DLID indexed table [17] |
| 52 | 0x12 | n/a | IPv6 Dest address [10] from DLID indexed table [18] |
| 53 | 0x13 | n/a | IPv6 Dest address [11] from DLID indexed table [19] |
| 54 | 0x14 | n/a | IPv6 Dest address [12] from DLID indexed table [20] |

TABLE 4-continued

| Field Byte # | Source Choice | Template value | Field Description |
|---|---|---|---|
| 55 | 0x15 | n/a | IPv6 Dest address [13] from DLID indexed table [21] |
| 56 | 0x16 | n/a | IPv6 Dest address [14] from DLID indexed table [22] |
| 57 | 0x17 | n/a | IPv6 Dest address [15] from DLID indexed table [23] |
| 58 | 0x80 | TBD | UDP Source port [0] |
| 59 | 0x80 | TBD | UDP Source port [1] |
| 60 | 0x80 | TBD | UDP Dest port [0] |
| 61 | 0x80 | TBD | UDP Dest port [1] |
| 62 | 0x80 | 0x00 | UDP Length [0] |
| 63 | 0x80 | 0x00 | UDP Length [1] |
| 64 | 0x80 | 0x00 | Placeholder for UDP Checksum [0] |
| 65 | 0x80 | 0x00 | Placeholder for UDP Checksum [1] |

Figure 6:
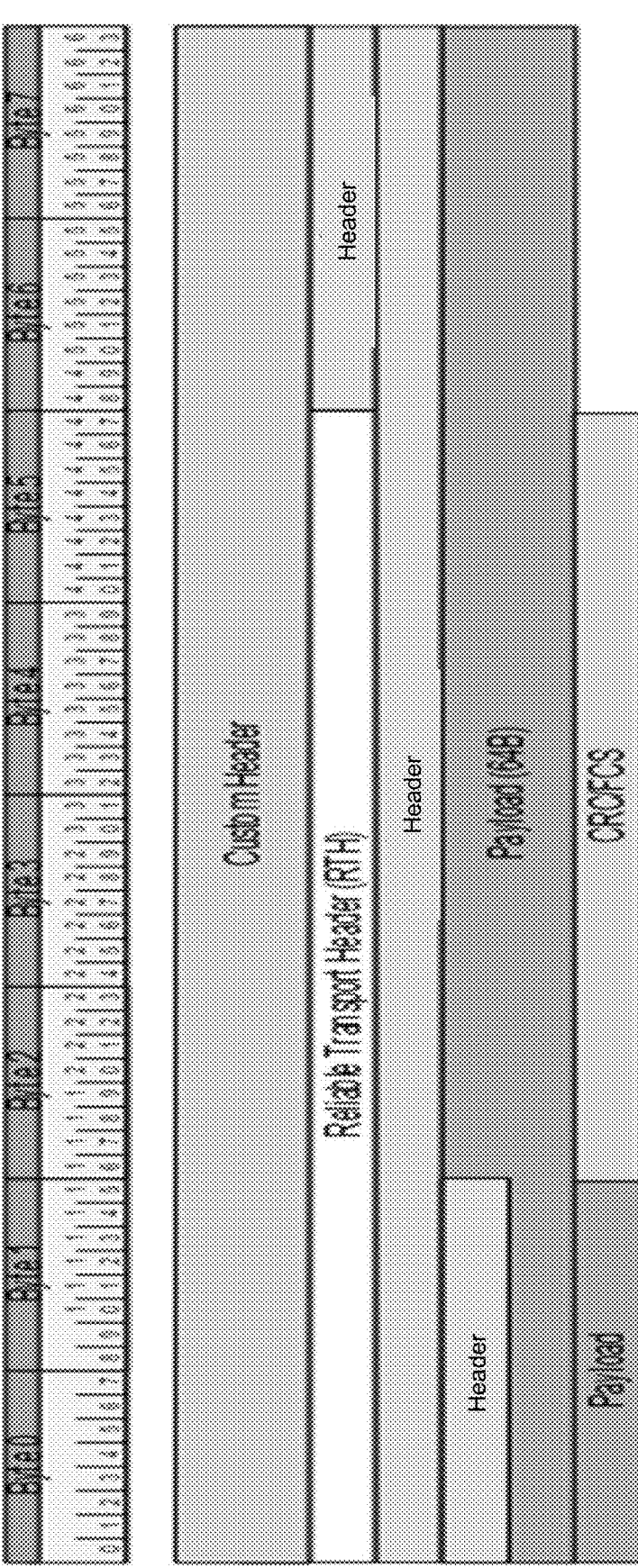
FIG. 6 depicts an example packet format.

FIG. 6 depicts an example of a header format for a small (e.g., private) network. Table 5 provides an example of bytes in the packet of FIG. 6.

TABLE 1

HPC Ethernet Header Build-up

| Field Byte # | Source Choice | Template value | Field Description |
|---|---|---|---|
| 0 | 0x80 | TBD | Custom fields-from template |
| 1 | 0x80 | TBD | Custom fields-from template |
| 2 | 0x80 | TBD | Custom fields-from template |
| 3 | 0x80 | TBD | Custom fields-from template |
| 4 | 0x80 | TBD | Custom fields-from template |
| 5 | 0x40 | TBD | Custom fields-from template |
| 6 | 0x80 | TBD | Custom fields-from template |
| 7 | 0x0c | TBD | DLID indexed field |
| 8 | 0x0d | TBD | DLID indexed field |
| 9 | 0x0e | TBD | DLID indexed field |
| 10 | 0x80 | TBD | Custom fields-from template |
| 11 | 0x80 | TBD | Custom fields-from template |
| 12 | 0x20 | TBD | SLID' indexed field |
| 13 | 0x21 | TBD | SLID' indexed field |
| 14 | 0x00 | TBD | DLID indexed field |
| 15 | 0x01 | TBD | DLID indexed field |

Figure 7:
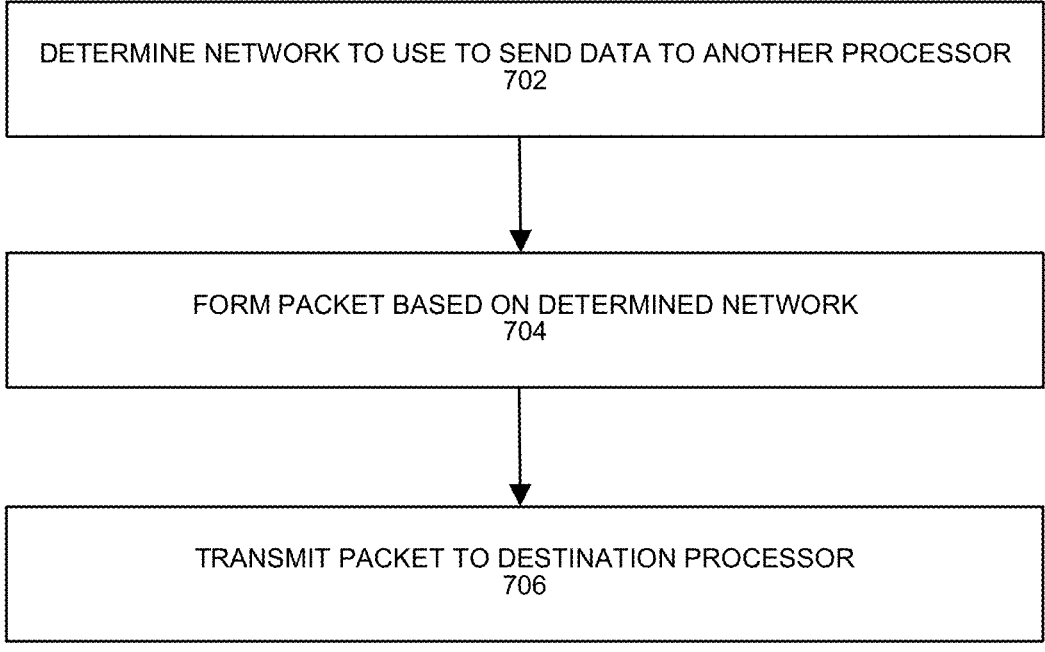
FIG. 7 depicts an example process.

FIG. 7 depicts an example process. The process can be performed by an interface of a processor. At 702, determine network used to send data. Network utilized to transmit a packet comprises one or more of: direct interconnect, small scale-up network, or large scale-out network. Network can be determined based on egress port. At 704, based on determined network, form packet for the data. Form the packet based on the decided packet format is to form the packet based on one or more of: source address (SA), destination address (DA), and context-indexed table. In formed packet, identify the packet format in one or more bytes near and/or at start of frame (SoF) delimiter byte, header, preamble. At 706, transmit the formed packet to destination.

Figure 8:
FIG. 8 depicts an example network interface device.
Figure 8:
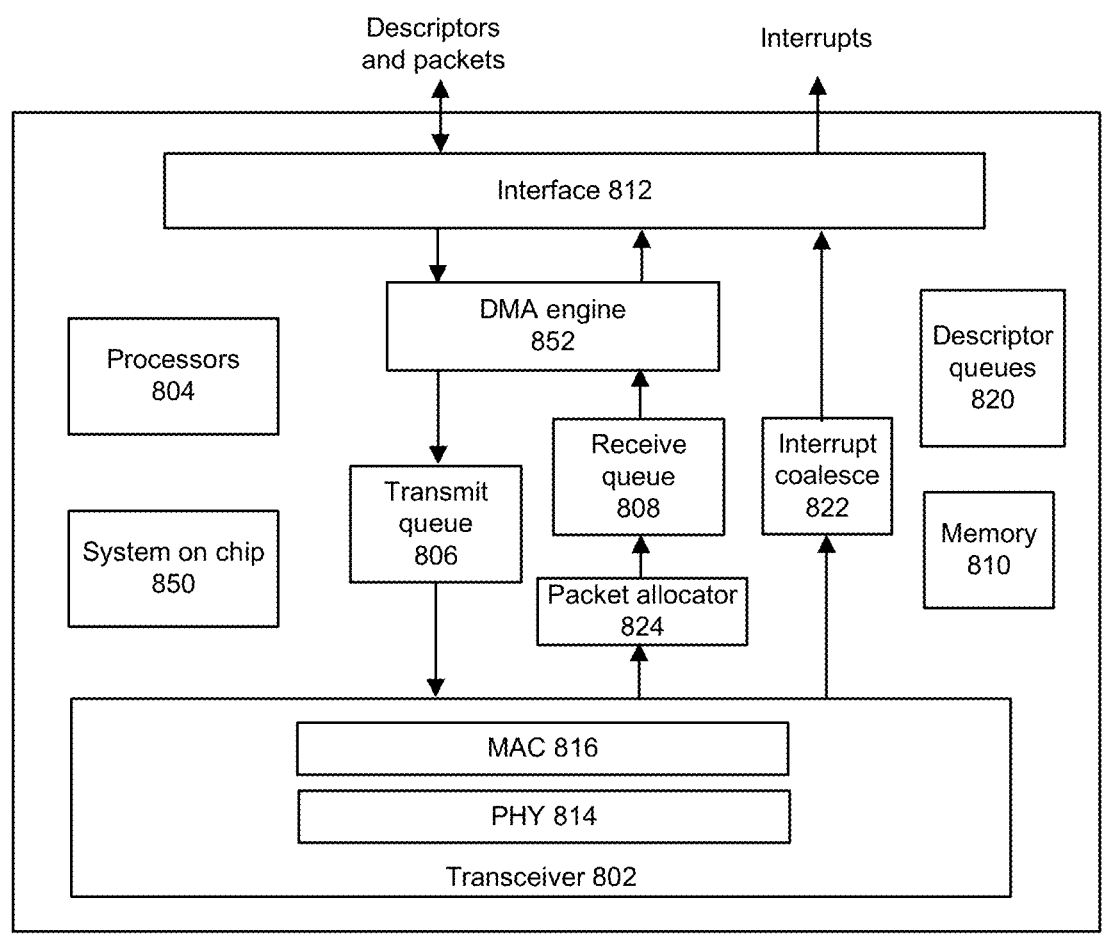

FIG. 8 depicts an example network interface device. The network interface device can include processors to form a packet based on a type of network to use to reach a destination processor or device, as described herein. Network interface 800 can include transceiver 802, processors 804, transmit queue 806, receive queue 808, memory 810, and bus interface 812, and DMA engine 852. Transceiver 802 can be capable of receiving and transmitting packets in conformance with the applicable protocols such as Ethernet as described in IEEE 802.3, although other protocols may be used. Transceiver 802 can receive and transmit packets from and to a network via a network medium (not depicted). Transceiver 802 can include PHY circuitry 814 and media access control (MAC) circuitry 816. PHY circuitry 814 can include encoding and decoding circuitry (not shown) to encode and decode data packets according to applicable physical layer specifications or standards. MAC circuitry 816 can be configured to assemble data to be transmitted into packets, that include destination and source addresses along with network control information and error detection hash values.

Processors 804 can be any a combination of a: processor, core, graphics processing unit (GPU), field programmable gate array (FPGA), application specific integrated circuit (ASIC), or other programmable hardware device that allow programming of network interface 800. For example, a "smart network interface" can provide packet processing capabilities in the network interface using processors 804. Configuration of operation of processors 804, including its data plane, can be programmed using Programming Protocol-independent Packet Processors (P4), C, Python, Broadcom Network Programming Language (NPL), or x86 compatible executable binaries or other executable binaries. Processors 804 can execute instructions to form a packet based on a type of network to use to reach a destination processor or device, as described herein. System on chip 850 can include microprocessors that execute instructions to form a packet based on a type of network to use to reach a destination processor or device, as described herein.

Packet allocator 824 can provide distribution of received packets for processing by multiple CPUs or cores using timeslot allocation described herein or RSS. When packet allocator 824 uses RSS, packet allocator 824 can calculate a hash or make another determination based on contents of a received packet to determine which CPU or core is to process a packet.

Interrupt coalesce 822 can perform interrupt moderation whereby network interface interrupt coalesce 822 waits for multiple packets to arrive, or for a time-out to expire, before generating an interrupt to host system to process received packet(s). Receive Segment Coalescing (RSC) can be performed by network interface 800 whereby portions of incoming packets are combined into segments of a packet. Network interface 800 provides this coalesced packet to an application.

Direct memory access (DMA) engine 852 can copy a packet header, packet payload, and/or descriptor directly from host memory to the network interface or vice versa, instead of copying the packet to an intermediate buffer at the host and then using another copy operation from the intermediate buffer to the destination buffer.

Memory 810 can be any type of volatile or non-volatile memory device and can store any queue or instructions used to program network interface 800. Transmit queue 806 can include data or references to data for transmission by network interface. Receive queue 808 can include data or references to data that was received by network interface from a network. Descriptor queues 820 can include descriptors that reference data or packets in transmit queue 806 or receive queue 808. Bus interface 812 can provide an interface with host device (not depicted). For example, bus interface 812 can be compatible with PCI, PCI Express, PCI-x, Serial ATA, and/or USB compatible interface (although other interconnection standards may be used).

Figure 9:
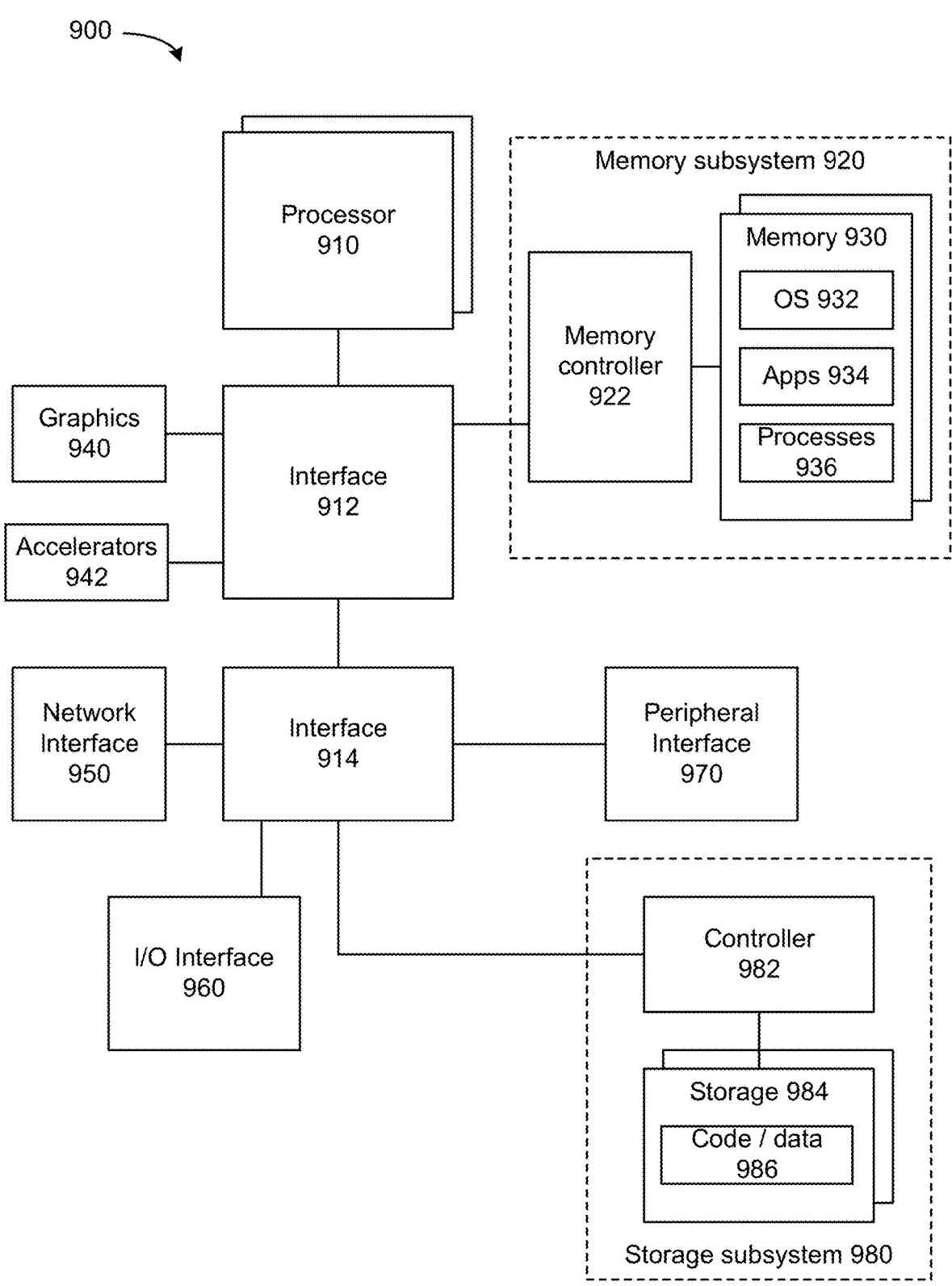
FIG. 9 depicts an example computing system.

FIG. 9 depicts an example computing system. Components of system 900 (e.g., processor 910, network interface 950, and so forth) to form a packet based on a type of network to use to reach a destination processor or device, as described herein. System 900 includes processor 910, which provides processing, operation management, and execution of instructions for system 900. Processor 910 can include any type of microprocessor, central processing unit (CPU), graphics processing unit (GPU), processing core, or other processing hardware to provide processing for system 900, or a combination of processors. Processor 910 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 900 includes interface 912 coupled to processor 910, which can represent a higher speed interface or a high throughput interface for system components that needs higher bandwidth connections, such as memory subsystem 920 or graphics interface components 940, or accelerators 942. Interface 912 represents an interface circuit, which can be a standalone component or integrated onto a processor die. Where present, graphics interface 940 interfaces to graphics components for providing a visual display to a user of system 900. In one example, graphics interface 940 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 940 generates a display based on data stored in memory 930 or based on operations executed by processor 910 or both. In one example, graphics interface 940 generates a display based on data stored in memory 930 or based on operations executed by processor 910 or both.

Accelerators 942 can be a fixed function or programmable offload engine that can be accessed or used by a processor 910. For example, an accelerator among accelerators 942 can provide compression (DC) capability, cryptography services such as public key encryption (PKE), cipher, hash/authentication capabilities, decryption, or other capabilities or services. In some embodiments, in addition or alternatively, an accelerator among accelerators 942 provides field select controller capabilities as described herein. In some cases, accelerators 942 can be integrated into a CPU socket (e.g., a connector to a motherboard or circuit board that includes a CPU and provides an electrical interface with the CPU). For example, accelerators 942 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 942 can provide multiple neural networks, CPUs, processor cores, general purpose graphics processing units, or graphics processing units can be made available for use by artificial intelligence (AI), AI training, machine learning (ML) models, and/or inferences based on AI or ML models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 920 represents the main memory of system 900 and provides storage for code to be executed by processor 910, or data values to be used in executing a routine. Memory subsystem 920 can include one or more memory devices 930 such as read-only memory (ROM), flash memory, one or more varieties of random access memory (RAM) such as DRAM, or other memory devices, or a combination of such devices. Memory 930 stores and hosts, among other things, operating system (OS) 932 to provide a software platform for execution of instructions in system 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide software logic to provide functions for system 900. In one example, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910.

Applications 934 and/or processes 936 can refer instead or additionally to a virtual machine (VM), container, microservice, processor, or other software. Various examples described herein can perform an application composed of microservices, where a microservice runs in its own process and communicates using protocols (e.g., application program interface (API), a Hypertext Transfer Protocol (HTTP) resource API, message service, remote procedure calls (RPC), or Google RPC (gRPC)). Microservices can communicate with one another using a service mesh and be executed in one or more data centers or edge networks. Microservices can be independently deployed using centralized management of these services. The management system may be written in different programming languages and use different data storage technologies. A microservice can be characterized by one or more of: polyglot programming (e.g., code written in multiple languages to capture additional functionality and efficiency not available in a single language), or lightweight container or virtual machine deployment, and decentralized continuous microservice delivery.

A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can include an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from another, allowing virtual machines to run Linux®, Windows® Server, VMware ESXi, and other operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers may be isolated from the other software and the operating system itself. The isolated nature of containers provides several benefits. First, the software in a container will run the same in different environments. For example, a container that includes PHP and MySQL can run identically on both a Linux® computer and a Windows® machine. Second, containers provide added security since the software will not affect the host operating system. While an installed application may alter system settings and modify resources, such as the Windows registry, a container can only modify settings within the container.

In some examples, OS 932 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on one or more processors sold or designed by Intel®, ARM®, AMD®, Qualcomm®, IBM®, Nvidia®, Broadcom®, Texas Instruments®, among others. In some examples, a driver can configure network interface 950 to form a packet based on a type of network to use to reach a destination processor or device, as described herein. In some examples, a driver can enable or disable offload to network interface 950 to form a packet based on a type of network to use to reach a destination processor or device, as described herein. A driver can advertise capability of network interface 950 to form a packet based on a type of network to use to reach a destination processor or device, as described herein.

While not specifically illustrated, it will be understood that system 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 900 includes interface 914, which can be coupled to interface 912. In one example, interface 914 represents an interface circuit, which can include standalone components and integrated circuitry. In one example, multiple user interface components or peripheral components, or both, couple to interface 914. Network interface 950 provides system 900 the ability to communicate with remote devices (e.g., servers or other computing devices) over one or more networks. Network interface 950 can include an Ethernet adapter, wireless interconnection components, cellular network interconnection components, USB (universal serial bus), or other wired or wireless standards-based or proprietary interfaces. Network interface 950 can transmit data to a device that is in the same data center or rack or a remote device, which can include sending data stored in memory.

Some examples of network interface 950 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 900 includes one or more input/output (I/O) interface(s) 960. I/O interface 960 can include one or more interface components through which a user interacts with system 900 (e.g., audio, alphanumeric, tactile/touch, or other interfacing). Peripheral interface 970 can include any hardware interface not specifically mentioned above. Peripherals refer generally to devices that connect dependently to system 900. A dependent connection is one where system 900 provides the software platform or hardware platform or both on which operation executes, and with which a user interacts.

In one example, system 900 includes storage subsystem 980 to store data in a nonvolatile manner. In one example, in certain system implementations, at least certain components of storage 980 can overlap with components of memory subsystem 920. Storage subsystem 980 includes storage device(s) 984, which can be or include any conventional medium for storing large amounts of data in a nonvolatile manner, such as one or more magnetic, solid state, or optical based disks, or a combination. Storage 984 holds code or instructions and data 986 in a persistent state (e.g., the value is retained despite interruption of power to system 900). Storage 984 can be generically considered to be a "memory," although memory 930 is typically the executing or operating memory to provide instructions to processor 910. Whereas storage 984 is nonvolatile, memory 930 can include volatile memory (e.g., the value or state of the data is indeterminate if power is interrupted to system 900). In one example, storage subsystem 980 includes controller 982 to interface with storage 984. In one example controller 982 is a physical part of interface 914 or processor 910 or can include circuits or logic in both processor 910 and interface 914.

A volatile memory is memory whose state (and therefore the data stored in it) is indeterminate if power is interrupted to the device. Dynamic volatile memory uses refreshing the data stored in the device to maintain state. One example of dynamic volatile memory includes DRAM (Dynamic Random Access Memory), or some variant such as Synchronous DRAM (SDRAM). An example of a volatile memory include a cache.

A non-volatile memory (NVM) device is a memory whose state is determinate even if power is interrupted to the device. In one embodiment, the NVM device can comprise a block addressable memory device, such as NAND technologies. A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), or a combination of one or more of the above, or other memory.

A power source (not depicted) provides power to the components of system 900. More specifically, power source typically interfaces to one or multiple power supplies in system 900 to provide power to the components of system 900. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 900 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Examples herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade can include components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, edge servers, edge switches, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/ or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or combination thereof, including "X, Y, and/or Z.'"

Illustrative examples of the devices, systems, and methods disclosed herein are provided below. An embodiment of the devices, systems, and methods may include one or more, and combination of, the examples described below.

Example 1 includes one or more examples and includes an apparatus comprising: a network interface device comprising: circuitry to decide packet format of a packet including data to be transmitted based on network utilized to transmit the packet and circuitry to form the packet based on the decided packet format.

Example 2 includes one or more examples, wherein the network utilized to transmit the packet is based on an egress port of the packet.

Example 3 includes one or more examples, wherein the network utilized to transmit the packet comprises one or more of: direct interconnect, small scale-up network, or large scale-out network.

Example 4 includes one or more examples, wherein to decide packet format, the circuitry is to form the packet byte by byte to reduce overhead caused by preamble and number of header fields.

Example 5 includes one or more examples, wherein the circuitry to form the packet based on the decided packet format is to identify the packet format in one or more bytes near and/or at start of frame (SoF) delimiter byte, header, or preamble.

Example 6 includes one or more examples and includes a graphics processing unit (GPU) coupled to the network interface device, wherein the GPU is to provide the data to be transmitted in the packet and wherein the GPU and network interface device are integrated into a single system on chip (SoC).

Example 7 includes one or more examples, wherein the network interface device is to transmit packets of different formats simultaneously.

Example 8 includes one or more examples and includes a server coupled to the network interface device, wherein the server is to provide the data to be transmitted in the packet and the server is to specify the network utilized to transmit the packet.

Example 9 includes one or more examples and includes a datacenter, wherein the datacenter comprises a second network interface device that is to receive the transmitted packet and the second network interface device is configured to identify locations of headers of the packet and interpret the packet.

Example 10 includes one or more examples and includes a computer-readable medium comprising instructions stored thereon, that if executed by one or more processors, cause the one or more processors to: configure a network interface device to: decide packet format of a packet including data to be transmitted based on network utilized to transmit the packet and form the packet based on the decided packet format.

Example 11 includes one or more examples, wherein the network utilized to transmit the packet is based on an egress port of the packet.

Example 12 includes one or more examples, wherein the network utilized to transmit the packet comprises one or more of: direct interconnect, small scale-up network, or large scale-out network.

Example 13 includes one or more examples, wherein to decide packet format, the network interface device is to form the packet byte by byte to reduce overhead caused by preamble and number of header fields.

Example 14 includes one or more examples, wherein the network interface device is to form the packet based on the decided packet format is to form the packet based on one or more of: source address (SA), destination address (DA), and context-indexed table.

Example 15 includes one or more examples, wherein the network interface device is to form the packet based on the decided packet format is to identify the packet format in one or more bytes near and/or at start of frame (SoF) delimiter byte, header, or preamble.

Example 16 includes one or more examples, and includes a method comprising: a network interface device determining a packet format of a packet including data to be transmitted based on network utilized to transmit the packet and the network interface device forming the packet based on the determined packet format.

Example 17 includes one or more examples, wherein the network utilized to transmit the packet is based on an egress port of the packet.

Example 18 includes one or more examples, wherein the network utilized to transmit the packet comprises one or more of: direct interconnect, small scale-up network, or large scale-out network.

Example 19 includes one or more examples, and includes the network interface device forming the packet based on the determined packet format and based on one or more of: source address (SA), destination address (DA), and context-indexed table.

Example 20 includes one or more examples, and includes a network interface device identifying the packet format in one or more bytes near and/or at start of frame (SoF) delimiter byte, header, or preamble.

The invention claimed is:

1. An apparatus comprising:
a network interface device comprising:
a host interface;
a direct memory access (DMA) circuitry;
a network interface;
circuitry to select a packet format, from among multiple packet formats, of a packet including data to be transmitted and to indicate a format of the packet and an extent of byte reductions in a header of the packet; and
circuitry to form the packet based on the selected packet format, wherein:
based on the selected packet format comprising a first packet format, the header comprises a first set of protocol compliant fields and
based on the selected packet format comprising a second packet format, the header comprises a second set of protocol compliant fields and a size indicator field and wherein:
a number of fields in the first set of protocol compliant fields is less than a number of fields in the second set of protocol compliant fields, and
a size of a field in the first set of protocol compliant fields is smaller than a corresponding field in the second set of protocol compliant fields.

2. The apparatus of claim 1, wherein the circuitry is to select the packet format, from among multiple packet formats, of the packet including data to be transmitted is also based on a connection utilized to transmit the packet and wherein the connection utilized to transmit the packet is based on an egress port of the packet.

3. The apparatus of claim 2, wherein the connection utilized to transmit the packet comprises one or more of: direct interconnect, small scale-up network, or large scale-out network.

4. The apparatus of claim 1, wherein to select the packet format, the circuitry is to form the packet byte by byte to reduce overhead caused by preamble and number of header fields.

5. The apparatus of claim 1, wherein the circuitry to form the packet based on the selected packet format is to identify the packet format in one or more bytes near and/or at start of frame (SoF) delimiter byte, header, or preamble.

6. The apparatus of claim 1, comprising a graphics processing unit (GPU) coupled to the network interface device, wherein the GPU is to provide the data to be transmitted in the packet and wherein the GPU and network interface device are integrated into a single system on chip (SoC).

7. The apparatus of claim 1, wherein the network interface device is to transmit packets of different formats simultaneously.

8. The apparatus of claim 1, comprising a server coupled to the network interface device, wherein the server is to provide the data to be transmitted in the packet and the server is to specify a network utilized to transmit the packet.

9. The apparatus of claim 1, comprising a datacenter, wherein the datacenter comprises a second network interface device that is to receive the transmitted packet and the second network interface device is configured to identify locations of headers of the packet and interpret the packet.

10. At least one non-transitory computer-readable medium comprising instructions stored thereon, that if executed by one or more processors, cause the one or more processors to:
configure a network interface device, comprising a host interface, a direct memory access (DMA) circuitry, and a network interface, to:
select a packet format, from among multiple packet formats, of a packet including data to be transmitted to indicate a format of the packet and a level of byte reductions in a header of the packet; and
form the packet based on the selected packet format, wherein:
based on the selected packet format comprising a first packet format, the header comprises a first set of protocol compliant fields and
based on the selected packet format comprising a second packet format, the header comprises a second set of protocol compliant fields and a size indicator field and wherein:
a number of fields in the first set of protocol compliant fields is less than a number of fields in the second set of protocol compliant fields, and
a size of a field in the first set of protocol compliant fields is smaller than a corresponding field in the second set of protocol compliant fields.

11. The at least one non-transitory computer-readable medium of claim 10, wherein the select the packet format, from among multiple packet formats, of the packet including data to be transmitted is also based on a connection utilized to transmit the packet and wherein the connection utilized to transmit the packet is based on an egress port of the packet.

12. The at least one non-transitory computer-readable medium of claim 11, wherein the connection utilized to transmit the packet comprises one or more of: direct interconnect, small scale-up network, or large scale-out network.

13. The at least one non-transitory computer-readable medium of claim 10, wherein to decide packet format, the network interface device is to form the packet byte by byte to reduce overhead caused by preamble and number of header fields.

14. The at least one non-transitory computer-readable medium of claim 10, wherein the network interface device is to form the packet based on the selected packet format and based on one or more of: source address (SA), destination address (DA), and context-indexed table.

15. The at least one non-transitory computer-readable medium of claim 10, wherein the network interface device is to form the packet based on the selected packet format is to identify the packet format in one or more bytes near and/or at start of frame (SoF) delimiter byte, header, or preamble.

16. A method comprising:

a network interface device, comprising a host interface, a direct memory access (DMA) circuitry, and a network interface, determining a packet format, from among multiple packet formats, of a packet including data to be transmitted to indicate a format of the packet and byte reductions in a header of the packet; and the network interface device forming the packet based on the determined packet format, wherein:

based on the determined packet format comprising a first packet format, the header comprises a first set of protocol compliant fields and based on the determined packet format comprising a second packet format, the header comprises a second set of protocol compliant fields and a size indicator field and wherein:

a number of fields in the first set of protocol compliant fields is less than a number of fields in the second set of protocol compliant fields, and a size of a field in the first set of protocol compliant fields is smaller than a corresponding field in the second set of protocol compliant fields.

17. The method of claim 16, wherein the determining the packet format, from among multiple packet formats, of the packet including data to be transmitted is also based on a connection utilized to transmit the packet and wherein the connection utilized to transmit the packet is based on an egress port of the packet.

18. The method of claim 17, wherein the connection utilized to transmit the packet comprises one or more of: direct interconnect, small scale-up network, or large scale-out network.

19. The method of claim 16, comprising the network interface device forming the packet based on the determined packet format and based on one or more of: source address (SA), destination address (DA), and context-indexed table.

20. The method of claim 16, comprising network interface device identifying the packet format in one or more bytes near and/or at start of frame (SoF) delimiter byte, header, or preamble.

* * * * *